United States Patent
Yanagida et al.

(10) Patent No.: US 11,002,610 B2
(45) Date of Patent: May 11, 2021

(54) TEMPERATURE DETECTION MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Shinichi Takase, Mie (JP); Hiroki Shimoda, Mie (JP); Yoshinori Ito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD. ', Osaka (JP)

( * ) Notice: Subject to any disclaimer, the term of this patent is extended or adjusted under 35 U.S.C. 154(b) by 322 days.

(21) Appl. No.: 16/311,007

(22) PCT Filed: Jun. 7, 2017

(86) PCT No.: PCT/JP2017/021100
§ 371 (c)(1),
(2) Date: Dec. 18, 2018

(87) PCT Pub. No.: WO2017/221703
PCT Pub. Date: Dec. 28, 2017

(65) Prior Publication Data
US 2019/0178724 A1 Jun. 13, 2019

(30) Foreign Application Priority Data
Jun. 23, 2016 (JP) .............................. JP2016-124501

(51) Int. Cl.
*G01K 1/14* (2021.01)
*G01K 7/00* (2006.01)
(Continued)

(52) U.S. Cl.
CPC ................. *G01K 1/14* (2013.01); *G01K 1/18* (2013.01); *G01K 7/22* (2013.01)

(58) Field of Classification Search
USPC ........................................ 374/208, 163, 152
See application file for complete search history.

(56) References Cited

U.S. PATENT DOCUMENTS

| 2019/0041273 A1* | 2/2019 | Shimoda ............. H01M 10/482 |
| 2020/0014083 A1* | 1/2020 | Matsushima ............ G01K 1/14 |
| 2020/0033196 A1* | 1/2020 | Tanaka ................ H01M 2/1077 |

FOREIGN PATENT DOCUMENTS

| JP | 2011-060675 | 3/2011 |
| JP | 2013-137233 | 7/2013 |

(Continued)

OTHER PUBLICATIONS

U.S. Appl. No. 16/310,995 to Taiji Yanagida et al., filed Dec. 18, 2018.

*Primary Examiner* — Mirellys Jagan
(74) *Attorney, Agent, or Firm* — Greenblum & Bernstein, P.L.C.

(57) ABSTRACT

A temperature detection module for detecting a temperature of a measurement target is provided. The temperature detection module includes a temperature sensor, and a holder for holding the temperature sensor such that movement is possible in a separation and contact direction in which the temperature sensor is separated from and brought into contact with the measurement target. The temperature sensor includes a sensor main body portion in which a temperature detection element is accommodated, and a spring portion that is integrally provided on the sensor main body portion.

(Continued)

The spring portion is of a type that expands and contracts only in a single direction, and expands and contracts only in the separation and contact direction. The spring portion is attached to the holder and biases the temperature sensor such that a detection surface comes into contact with the measurement target.

4 Claims, 16 Drawing Sheets

(51) Int. Cl.
    *G01K 13/00* (2021.01)
    *G01K 1/18* (2006.01)
    *G01K 7/22* (2006.01)

(56) References Cited

FOREIGN PATENT DOCUMENTS

| | | |
|---|---|---|
| JP | 2015-069738 | 4/2015 |
| JP | 2016-050882 | 4/2016 |

* cited by examiner

Front ←——— Z ———→ Rear

TEMPERATURE DETECTION MODULE

TECHNICAL FIELD

The technique disclosed in this specification relates to a temperature detection module.

BACKGROUND ART

Conventionally, the technique disclosed in JP 2011-60675A has been known as a temperature detection module including a temperature sensor. The temperature detection module is attached to a power storage element group having multiple power storage elements.

A temperature sensor is attached to the temperature detection module. In the temperature sensor, an elastic arm protrudes obliquely upward from a main body portion in which a thermistor is accommodated. The elastic arm can be elastically deformed, and biases the main body portion toward the power storage element.

CITATION LIST

Patent Document

Patent Document 1: JP 2011-60675A

SUMMARY OF INVENTION

However, with the above-mentioned configuration, elastic arms (springs) 200 shown in FIG. 17 expand and contract in two directions, namely a separation and contact direction (X direction in FIG. 17) in which a temperature sensor 210 is separated from and brought into contact with a measurement target and a direction (W direction in FIG. 17) orthogonal to the separation and contact direction. That is, the elastic arms (springs) expand in the W direction during compression, and therefore, it is necessary to ensure a space that is wide in the W direction in order to arrange the elastic arms (springs) therein, thus causing a problem in that the temperature detection module increases in size as a whole.

The technique disclosed in this specification was achieved based on the foregoing circumstances, and it is an object thereof to provide a technique relating to a reduction in the size of a temperature detection module.

Solution to Problem

The technique disclosed in this specification is a temperature detection module for detecting a temperature of a measurement target, including: a temperature sensor; and a holder for holding the temperature sensor such that movement is possible in a separation and contact direction in which the temperature sensor is separated from and brought into contact with the measurement target, wherein the temperature sensor includes: a sensor main body portion in which a temperature detection element is accommodated; and a spring portion that is integrally provided on the sensor main body portion, the spring portion is of a type that expands and contracts only in a single direction, and expands and contracts only in the separation and contact direction, and the spring portion is attached to the holder and biases the temperature sensor such that a detection surface comes into contact with the measurement target.

With this configuration, the spring portion is of the type that expands and contracts only in a single direction, and does not expand in a direction other than a certain direction during compression. Therefore, the space in which the spring portion is arranged can be made narrower, thus making it possible to reduce the size of the temperature detection module as a whole. Moreover, the spring portion and the sensor main body portion are integrally formed, thus making it possible to reduce the number of components.

The following embodiments are preferred as embodiments of the temperature detection module.

The holder includes a locking portion that is locked to the spring in a direction orthogonal to the direction in which the spring portion expands and contracts. With this configuration, it is possible to lock the spring portion to the holder without causing the spring portion to yield.

Two or more spring portions are included, and the spring portions are arranged at positions that are rotationally symmetrical with respect to a center of the sensor main body portion. With this configuration, the inclination of the temperature sensor can be suppressed due to a bias in the spring force.

Stoppers that come into contact with each other and thus restrict the position of the temperature sensor relative to the holder when the temperature sensor is displaced to a restriction position are provided between the holder and the temperature sensor. With this configuration, it is possible to prevent the spring portion from being displaced beyond the restriction position, that is, suppress weakening of the spring portion due to excessive warping.

Advantageous Effects of Invention

With the temperature detection module disclosed in this specification, the size of the temperature detection module can be reduced.

DESCRIPTION OF EMBODIMENTS

Embodiment 1

Figure 1:
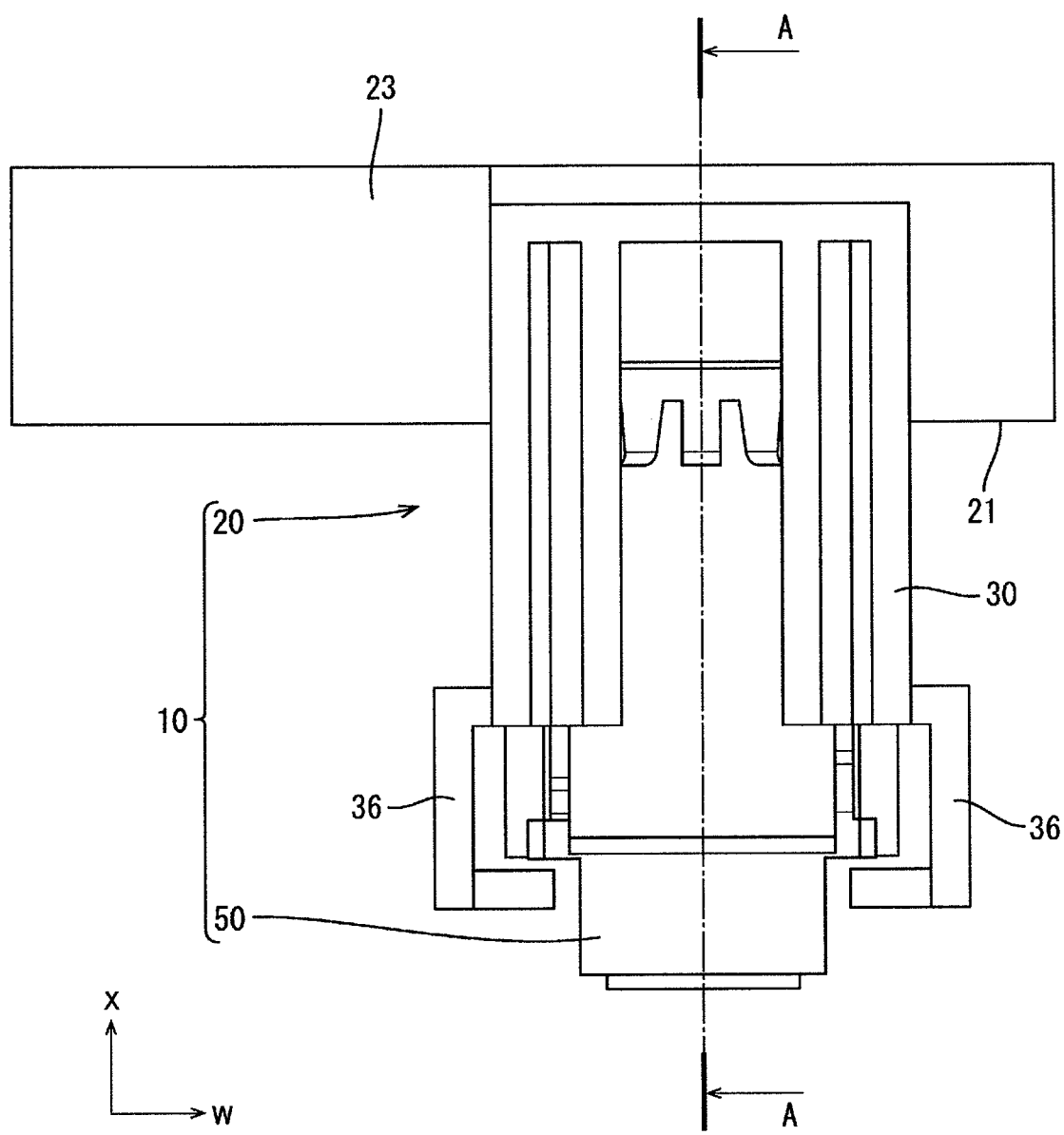
FIG. 1 is a front view of a temperature detection module according to Embodiment 1.
Figure 2:
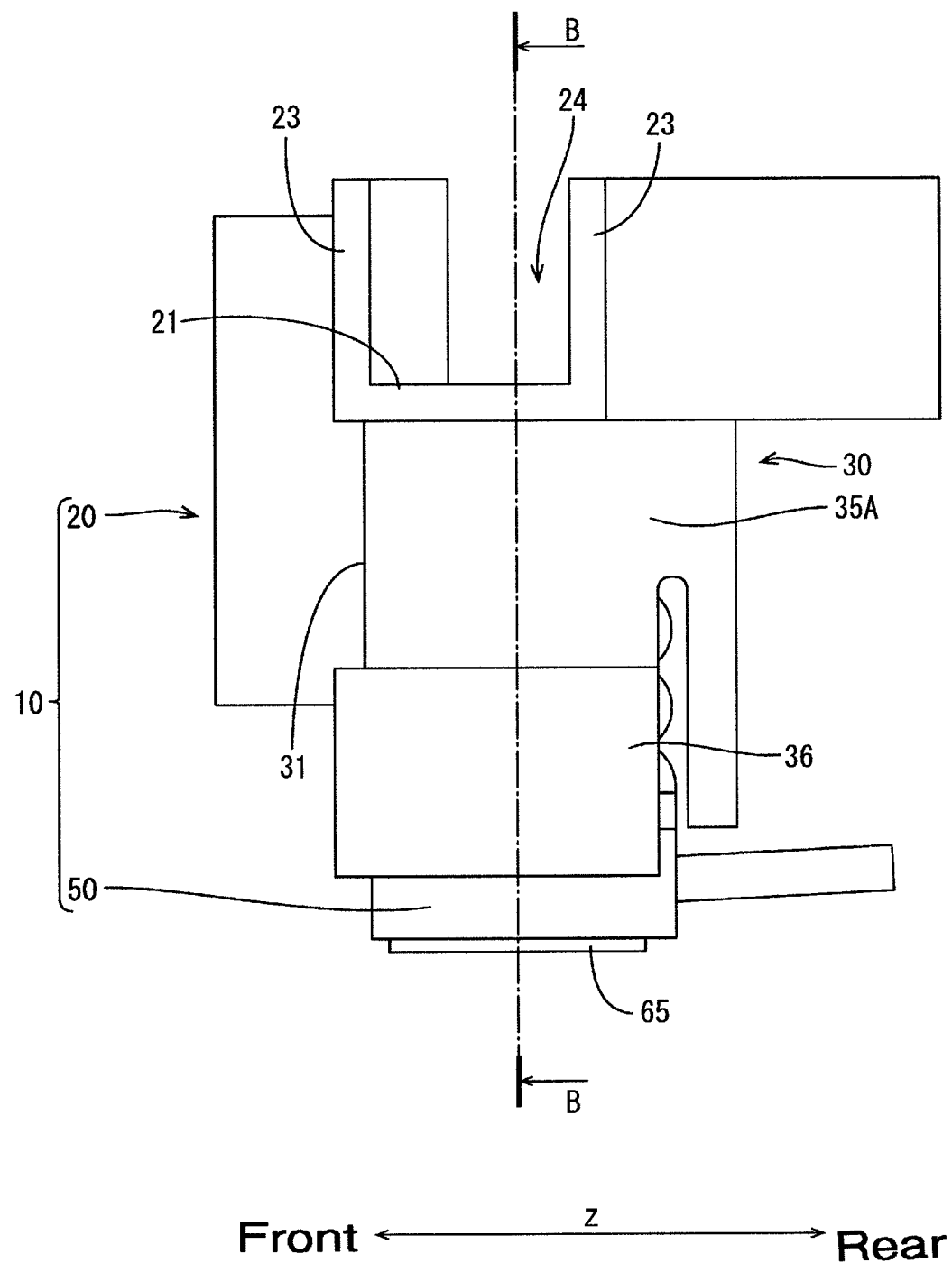
FIG. 2 is a side view of the temperature detection module.
Figure 3:
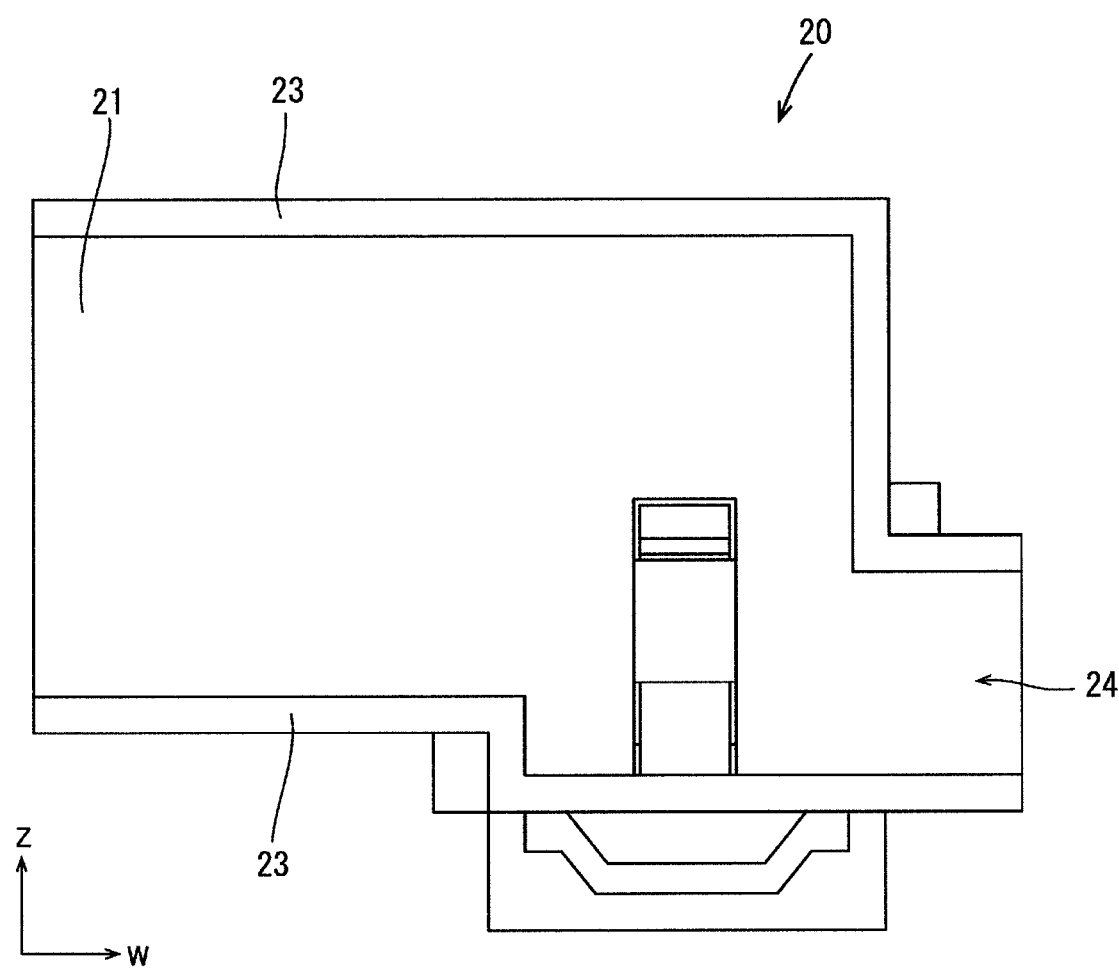
FIG. 3 is a plan view of the temperature detection module.
Figure 12:
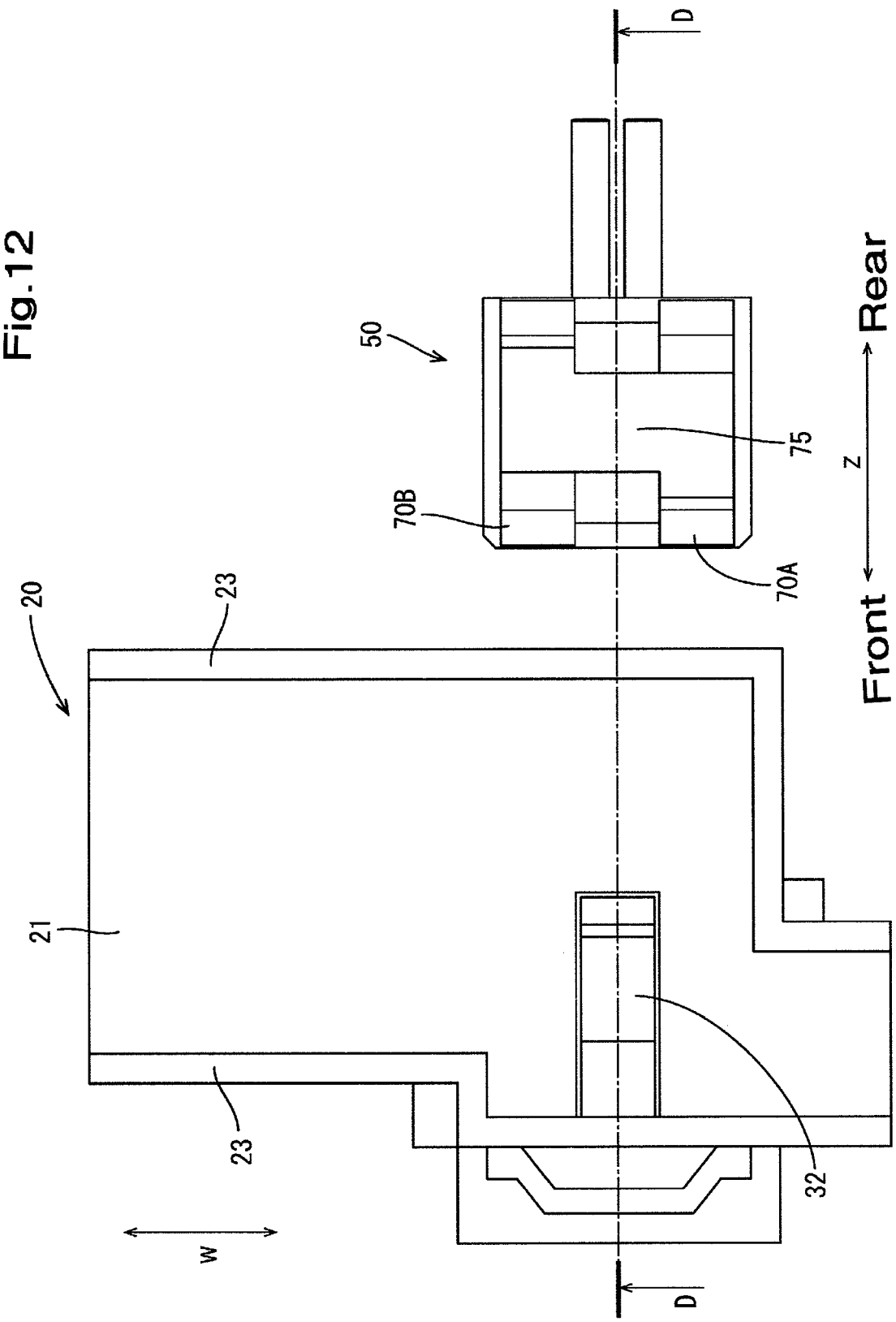
FIG. 12 is a plan view showing a sensor holder and the temperature sensor.
Figure 13:
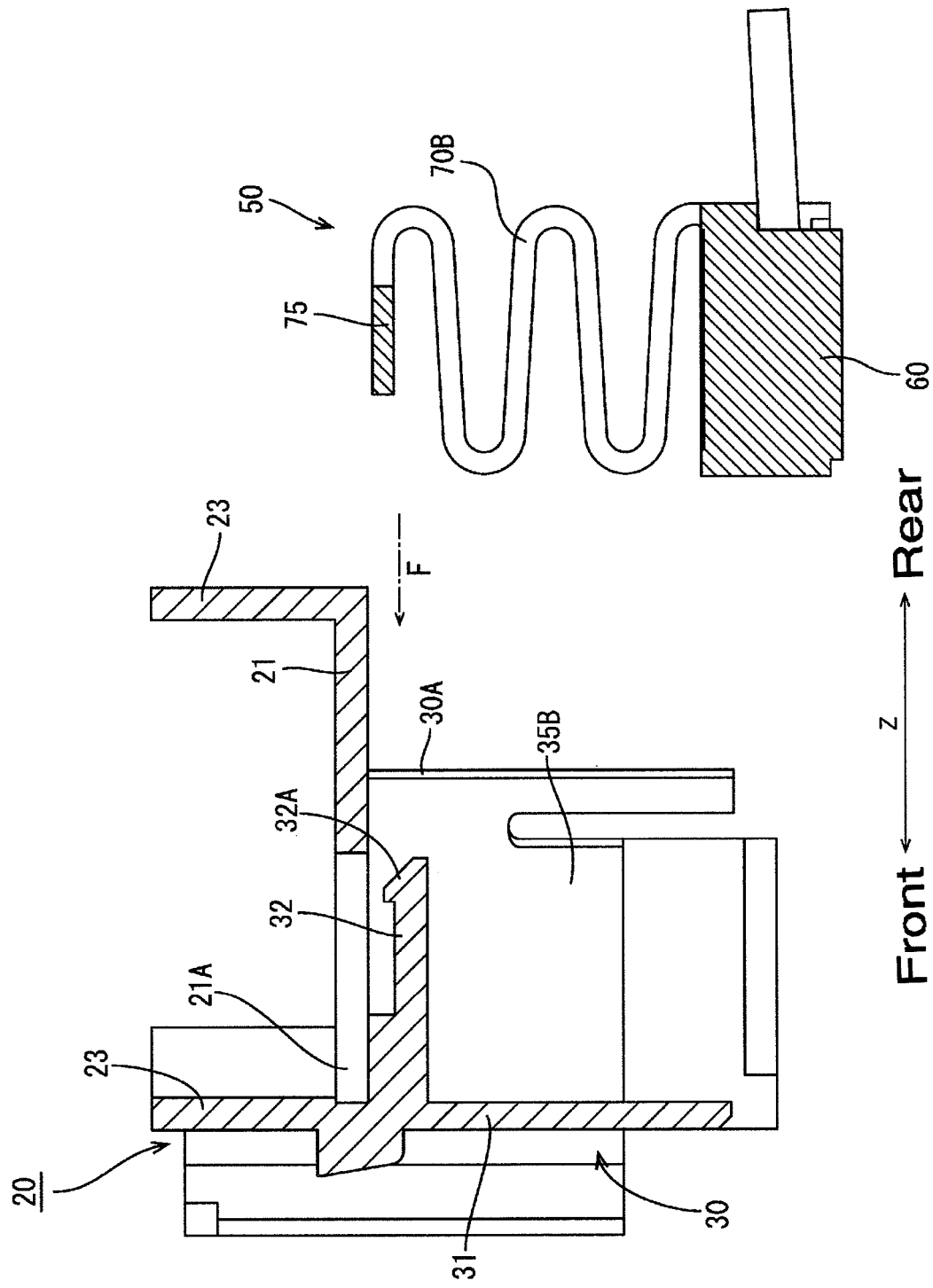
FIG. 13 is a cross-sectional view illustrating the procedure for attaching the temperature sensor to the sensor holder (a cross section taken along line D-D in FIG. 12).

Embodiment 1 according to the technique disclosed in this specification will be described with reference to FIGS. 1 to 16. It should be noted that in the present example, the diagrams show a mode in which the temperature sensor 50 moves in the vertical direction (X direction), separates from and comes into contact with the measurement target, and has a relationship in which the vertical direction (X direction) corresponds to the "separation and contact direction" of the present invention. Also, in the following description, as shown in FIGS. 1 to 3, the vertical direction refers to the "X direction" and directions orthogonal thereto refer to the "W direction" and the "Z direction". Also, the left sides of FIGS. 2, 12, and 13 are the "front side" and the right sides are the "rear side".

As shown in FIGS. 1 to 3, a temperature detection module 10 includes a sensor holder 20 and a temperature sensor 50. The sensor holder 20 is made of an insulating synthetic resin. The sensor holder 20 includes a base portion 21, upper walls 23, and an accommodating portion 30. It should be noted that the sensor holder 20 corresponds to a "holder" according to the present invention. The upper walls 23 stand upward in the X direction from the outer periphery of the base portion 21. The upper walls 23 are located on both sides in the Z direction and extend in the W direction, and both end sides in the W direction are open. A region of the sensor holder 20 surrounded by the upper walls 23 serves as an electric wire passage 24 (see FIGS. 2 and 3), and electric wires pulled out from the temperature sensor 50 are arranged in the W direction in the electric wire passage 24 through an insertion groove 23A formed at a portion of the upper walls 23.

Figure 4:
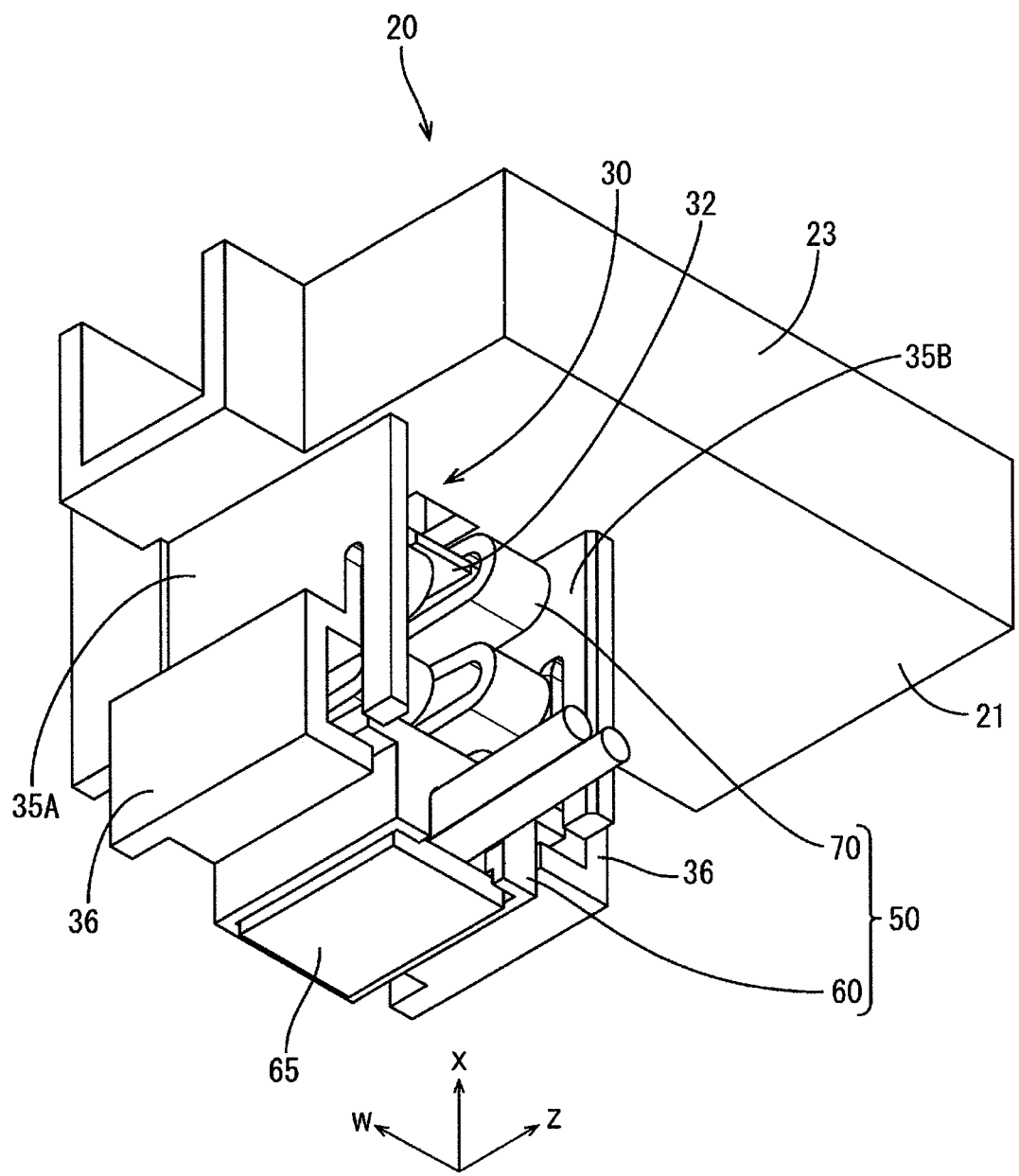
FIG. 4 is a perspective view of the temperature detection module.
Figure 5:
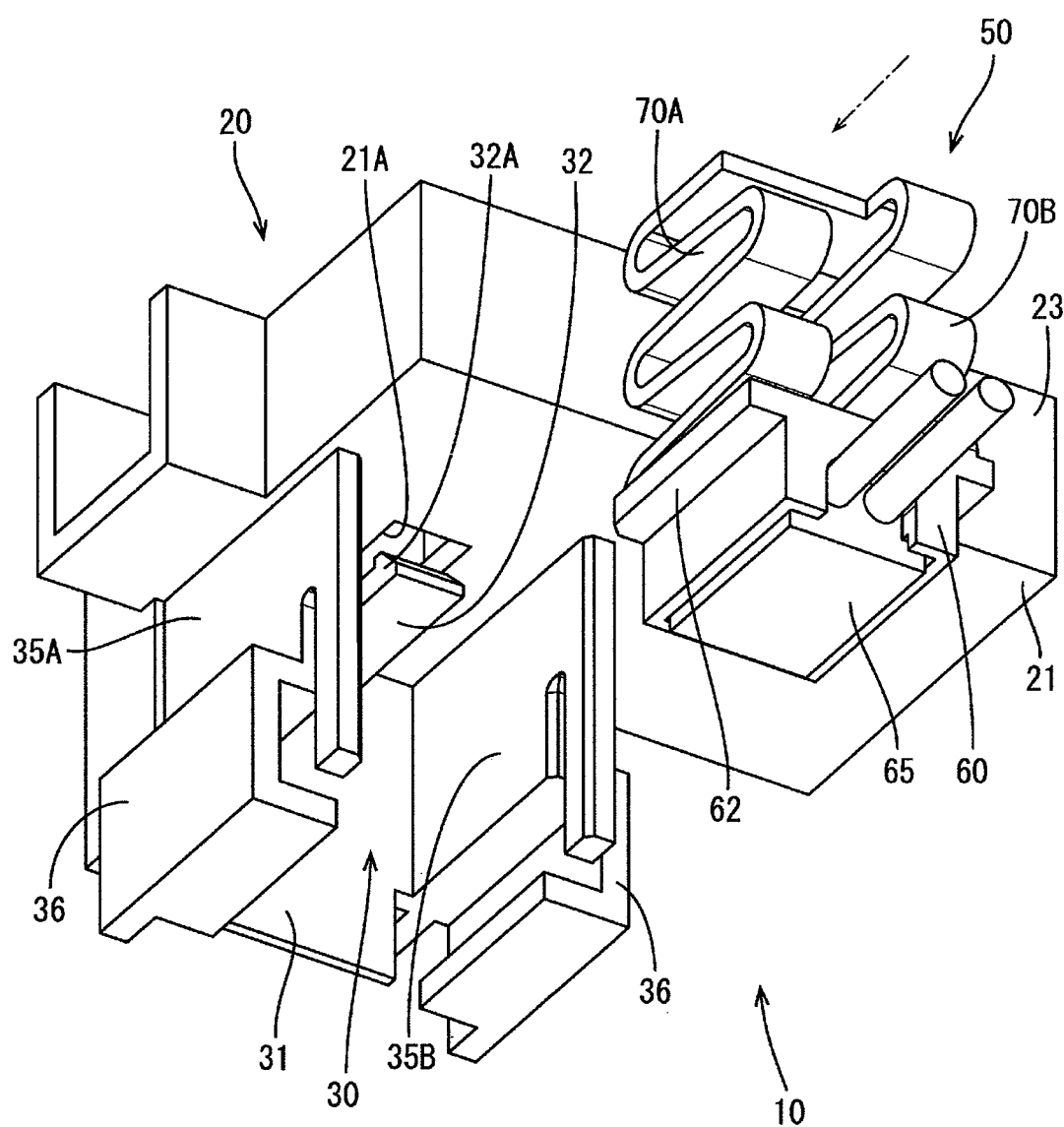
FIG. 5 is an exploded perspective view of the temperature detection module.

As shown in FIGS. 4 and 5, the accommodating portion 30 extends downward from the lower surface of the base portion 21 in the X direction. The accommodating portion 30 surrounds the three sides of the temperature sensor 50, and includes a front wall 31 and side walls 35A and 35B. The front wall 31 is located in front of the temperature sensor 50, and surrounds the front side of the temperature sensor 50. The front wall 31 is provided with a locking arm 32. The locking arm 32 extends horizontally in the Z direction, and a hook portion 32A is provided at the leading end of the locking arm 32. An opening 21A is provided at a position corresponding to the locking arm 32 in the base portion 21. This opening 21A is a removing hole for die molding. It should be noted that the locking arm 32 corresponds to a "locking portion" according to the present invention.

The two side walls 35A and 35B are located on both sides in the W direction of the temperature sensor 50, and surround both lateral sides of the temperature sensor 50. It should be noted that the lower side and the rear side of the accommodating portion 30 are not provided with walls and are open.

Moreover, as shown in FIG. 5, fitting portions 36 are provided on the lower portions of the side walls 35A and 35B. Each of the fitting portions 36 protrudes outward in the W direction. The fitting portions 36 have U-shaped cross sections that are open inward. Contact portions 62 provided on the temperature sensor 50 are located inside of the fitting portions 36.

Substantially the entire temperature sensor 50 excluding its lower portion is located inside of the accommodating portion 30, and the three sides, namely the front side and the two lateral sides, of the temperature sensor 50 are surrounded by the accommodating portion 30. On the other hand, the lower portion of the temperature sensor 50 protrudes downward from the accommodating portion 30.

Figure 6:
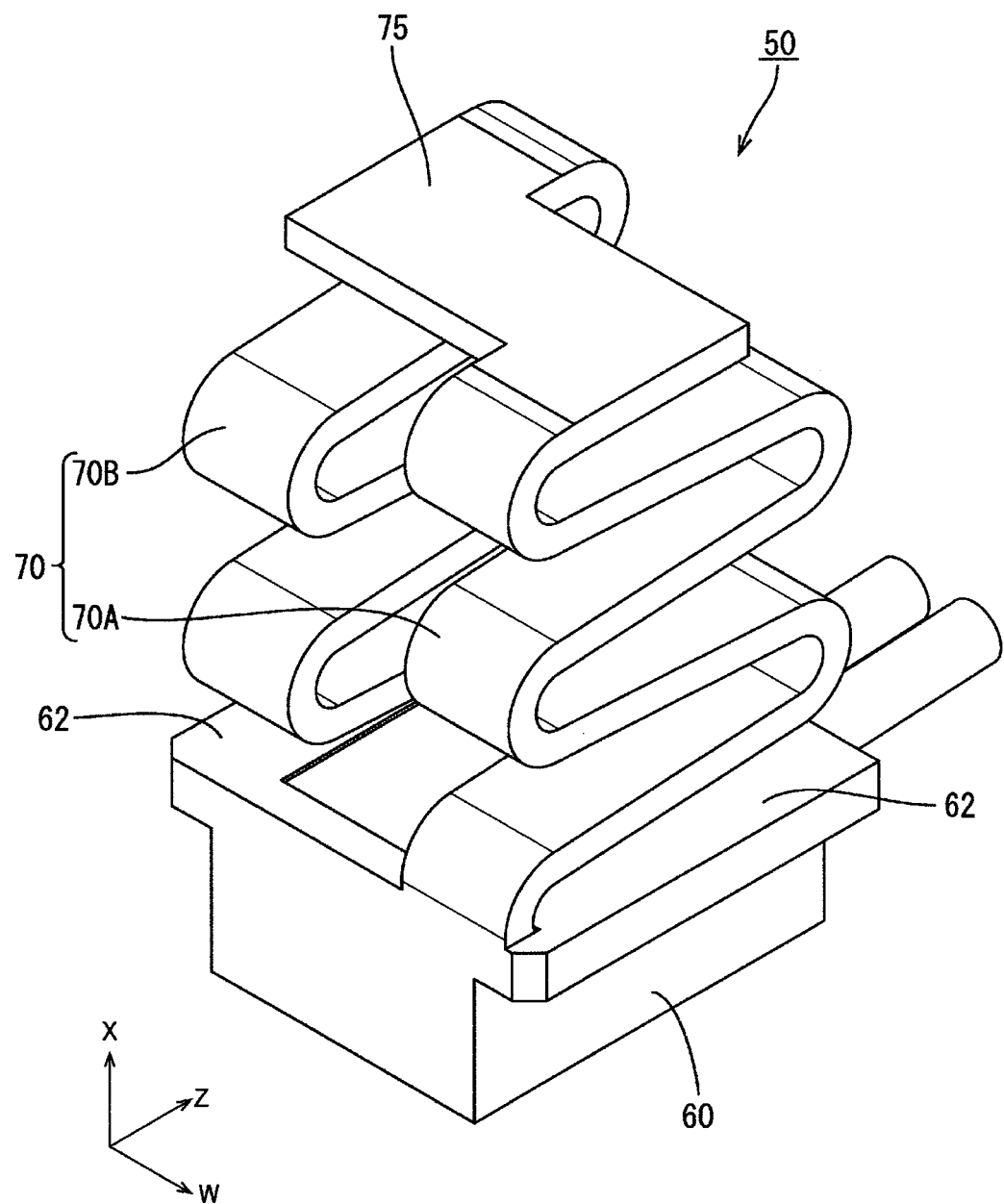
FIG. 6 is a perspective view of a temperature sensor.

As shown in FIG. 6, the temperature sensor 50 includes a sensor main body portion 60 and a spring portion 70. The spring portion 70 is made of an insulating synthetic resin and is formed integrally with the sensor main body portion 60. The spring portion 70 includes a first spring portion 70A and a second spring portion 70B.

The first spring portion 70A and the second spring portion 70B have a plate shape with a constant width. As shown in FIG. 6, the two spring portions 70A and 70B are located at both ends in the W direction of the sensor main body portion 60, and extend in parallel with each other in the Z direction. The two spring portions 70A and 70B are folded over at the front end and the rear end in the Z direction a plurality of times to form U-turn shapes. The two spring portions 70A and 70B expand and contract in the X direction and generate a spring force in the X direction. It should be noted that the two spring portions 70A and 70B expand and contract only in the X direction, and do not expand and contract in other directions (W direction and Z direction), and thus the spring force is not generated in the other directions.

Figure 7:
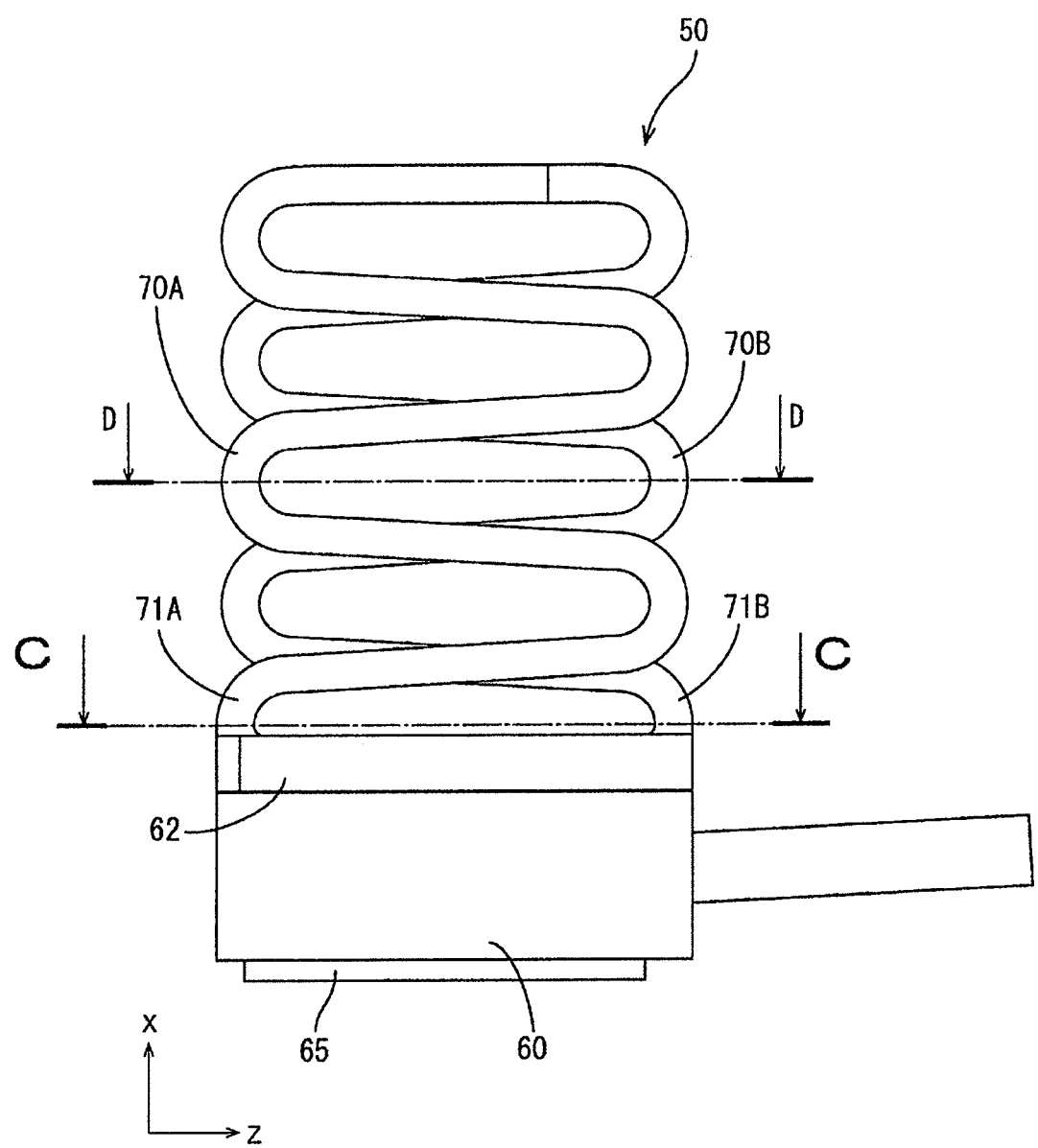
FIG. 7 is a side view of the temperature sensor.
Figure 8:
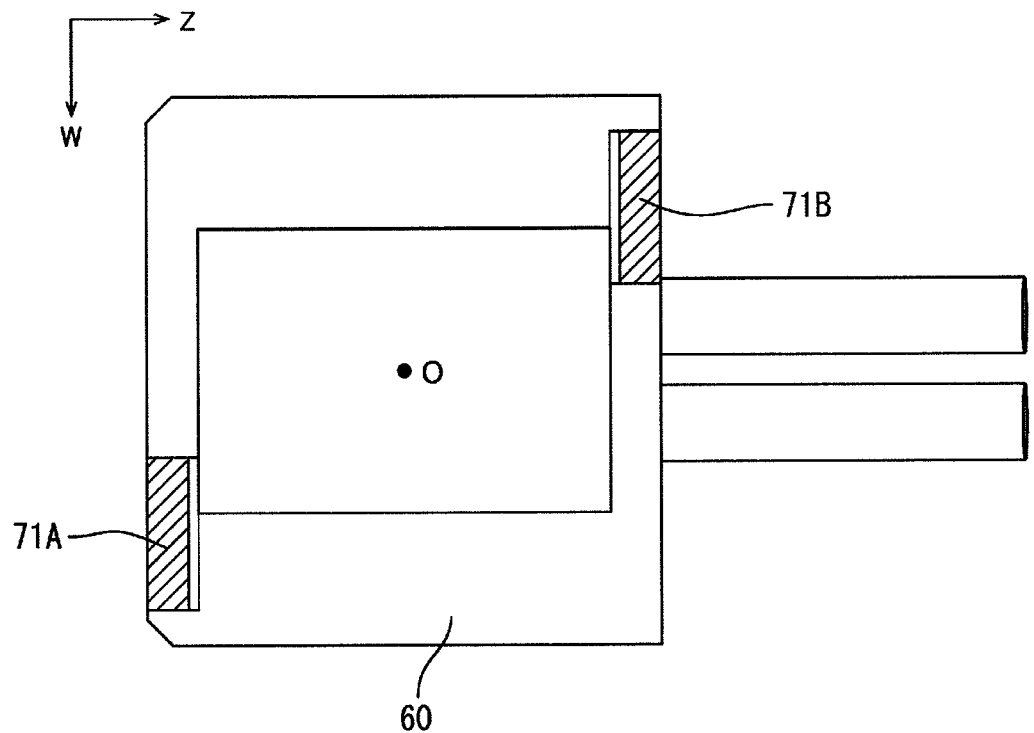
FIG. 8 is a cross-sectional view taken along line C-C in FIG. 7.

FIG. 7 is a side view of the temperature sensor, and FIG. 8 is a cross-sectional view of the temperature sensor 50 cut at the base end portions of the spring portions (cross-sectional view taken along line C-C in FIG. 7). It should be noted that the base end portions are portions that are coupled to the sensor main body portion 60, that is, the base portions of the spring portions.

The two spring portions 70A and 70B are arranged at positions that are rotationally symmetrical with respect to a center O of the sensor main body portion 60. Specifically, as shown in FIG. 8, a base end portion 71A of the first spring portion 70A and a base end portion 71B of the second spring portion 70B are located at substantially diagonal positions on the sensor main body portion 60, and are arranged at positions that are rotationally symmetrical with respect to the center O (rotationally symmetrical by 180° in this example). Accordingly, a bias in the spring force applied to the sensor main body portion 60 is suppressed, thus making it possible to suppress inclination of the sensor main body portion 60.

Figure 9:
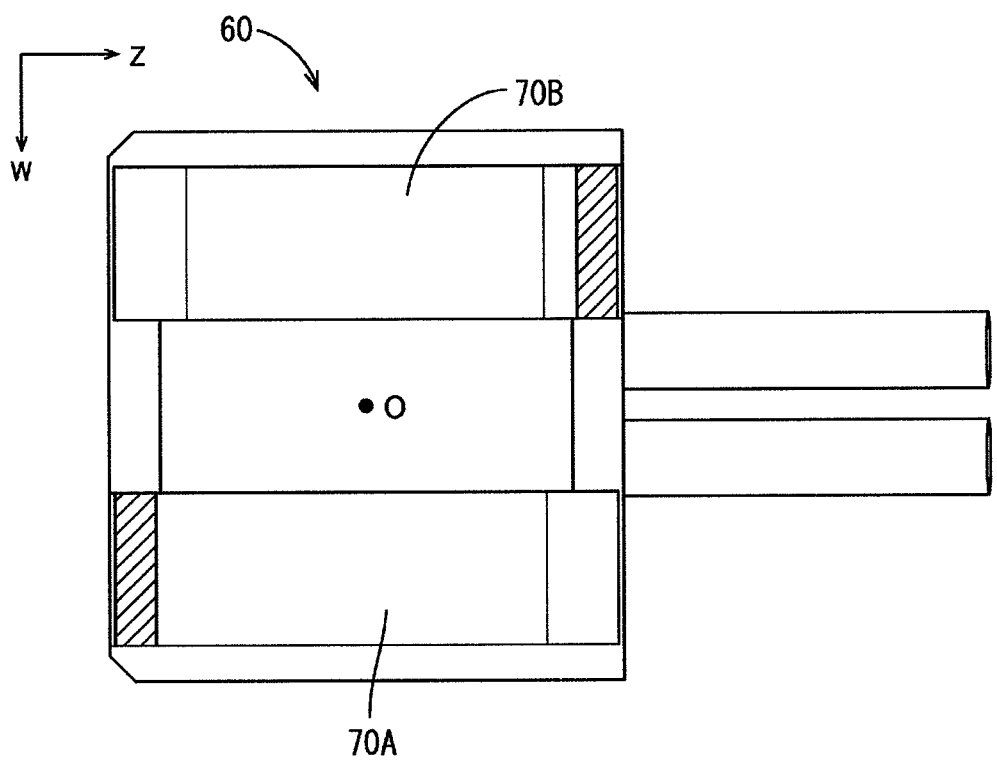
FIG. 9 is a cross-sectional view taken along line D-D in FIG. 7.

Furthermore, FIG. 9 is a cross-sectional view of the temperature sensor 50 cut at a position located a predetermined distance away from the base end portions (cross-sectional view taken along line D-D in FIG. 7). As shown in FIG. 9, the positional relationship between the first spring portion 70A and the second spring portion 70B is rotationally symmetrical (rotationally symmetrical by 180° in this example) with respect to the center O even at the position located away from the base end portions 71A and 71B in the X direction. This makes it possible to further suppress inclination of the sensor main body portion 60.

As shown in FIG. 6, the temperature sensor 50 includes a coupling wall 75. The coupling wall 75 extends in the W direction. The coupling wall 75 couples the upper end portion of the first spring portion 70A and the upper end portion of the second spring portion 70B together at substantially the center of the temperature sensor 50. The coupling wall 75 is locked to the locking arm 32, and thereby the accommodation portion 30 of the sensor holder 20 holds the temperature sensor 50.

Figure 11:
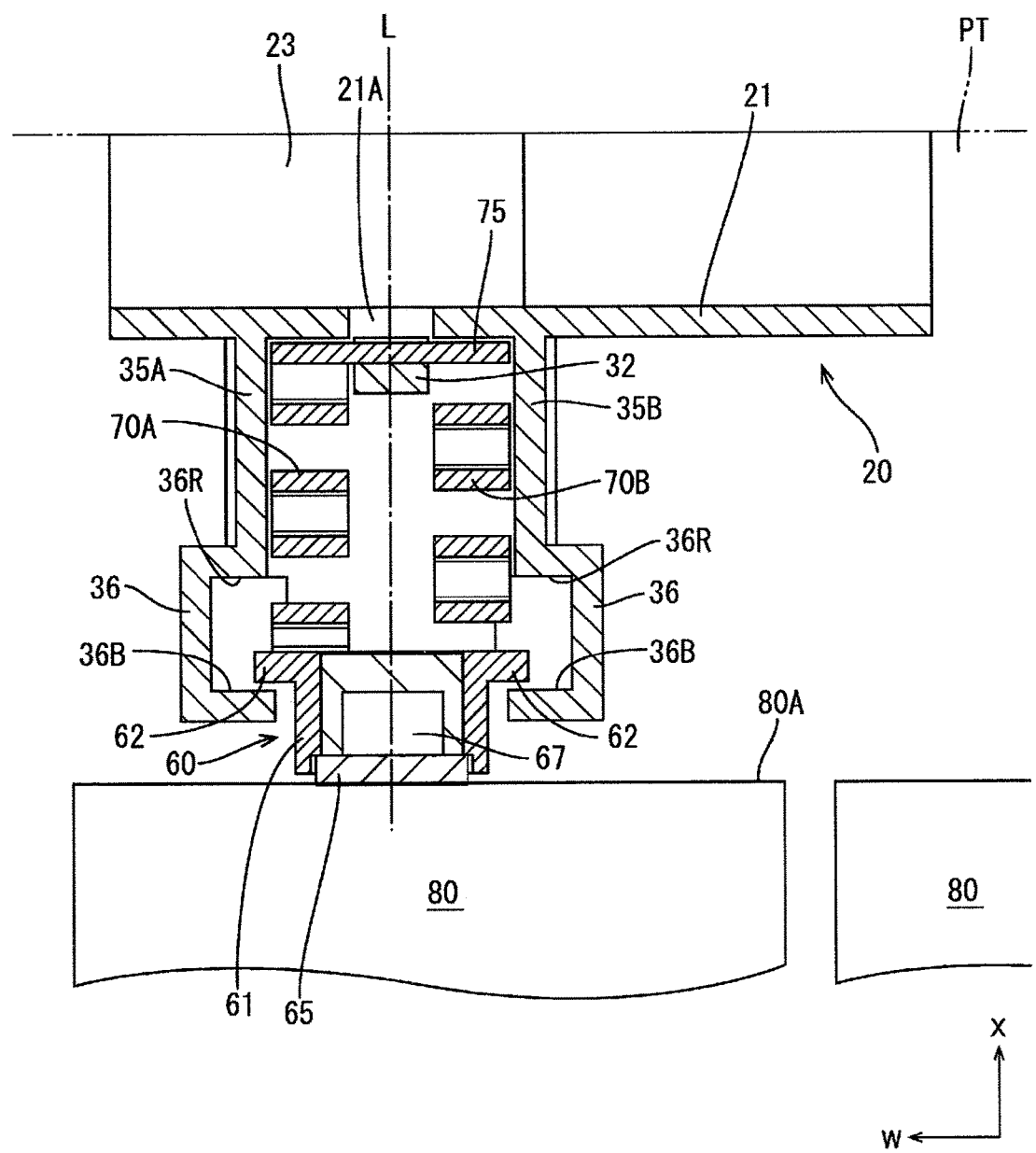
FIG. 11 is a cross-sectional view taken along line B-B in FIG. 2.

Moreover, as shown in FIG. 11, the contact portions 62 are provided on the upper end portion of the sensor main body portion 60. Each of the contact portions 62 protrudes outward in the W direction from the outer surface of the sensor main body portion (case) 60 and is located inside of the fitting portion 36. The "contact portions 62" and the "fitting portions 36" serve as stoppers that restrict the position of the temperature sensor 50 relative to the sensor holder 20 in the X direction.

That is, when the temperature sensor 50 is displaced from the position shown in FIG. 11 by a predetermined amount in a direction (upward direction) in which the spring portions 70 contract, and reaches a restriction position, the contact portions 62 come into contact with ceiling surfaces 36R of the fitting portions 36, and the movement of the temperature sensor 50 is thus restricted. On the other hand, when the temperature sensor 50 is displaced by a predetermined amount in a direction (downward direction) in which the spring portions 70 expand, and reaches a restriction position, the contact portions 62 come into contact with bottom surfaces 36B of the fitting portions 36, and the movement of the temperature sensor 50 is restricted. Accordingly, providing the stoppers for restricting the position of the temperature sensor 50 makes it possible to prevent the temperature sensor 50 from being displaced beyond the restriction positions, thus making it possible to suppress excessive warping of the spring portions 70 of the temperature sensor 50.

Figure 10:
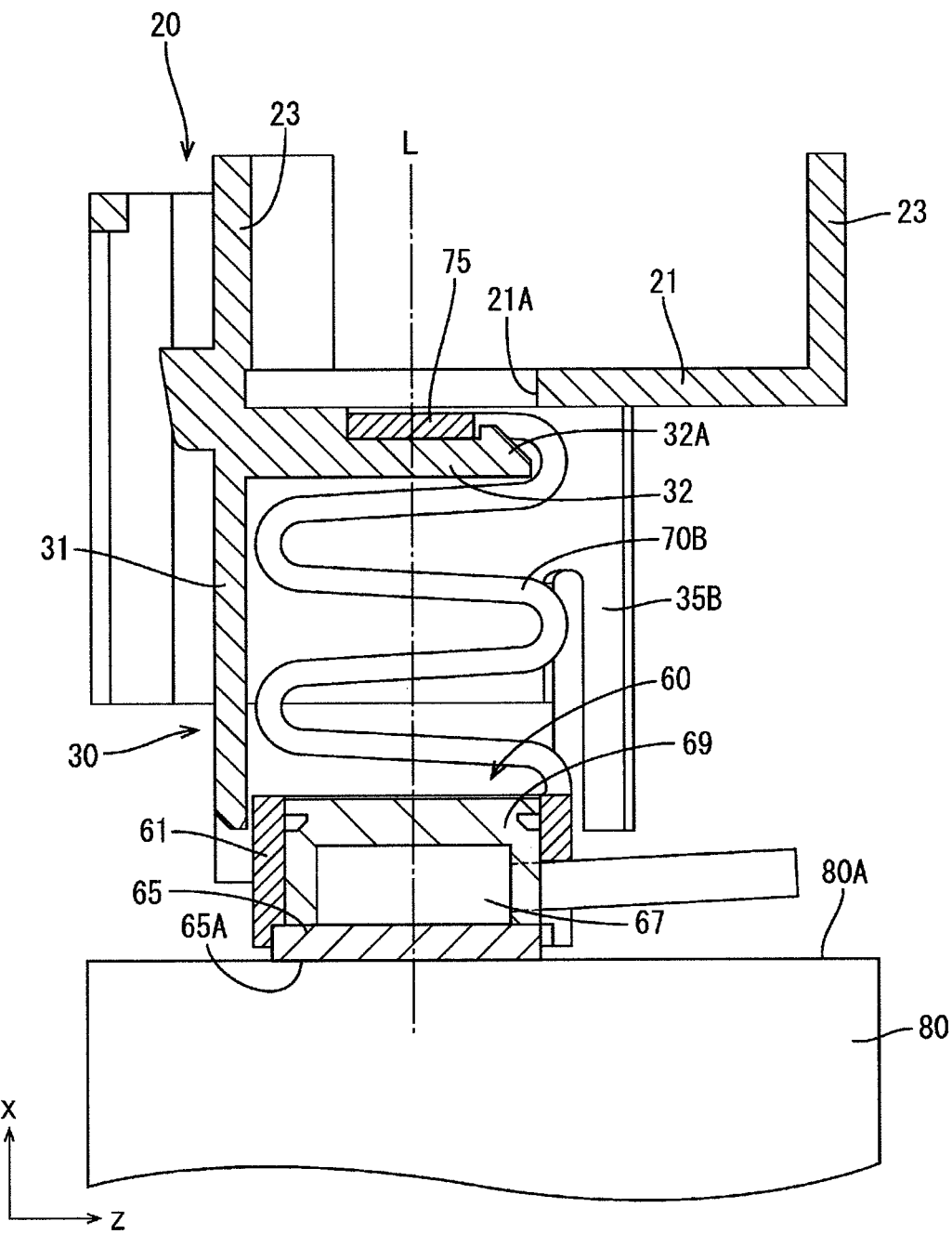
FIG. 10 is a cross-sectional view taken along line A-A in FIG. 1.

As shown in FIGS. 10 and 11, the sensor main body portion 60 includes a case 61 made of an insulating synthetic resin, a contact plate 65, and a temperature detection element 67. The case 61 has a polygonal tube shape that is open in a vertical direction. The above-mentioned spring portions 70A and 70B are formed integrally with the upper surface of the case 61, and the above-mentioned contact portions 62 are formed integrally with the outer surface of the case 61

The contact plate 65 is made of a material with a high thermal conductivity (e.g., metal, a metal oxide, or ceramic). As the metal constituting the contact plate 65, any metal can be selected as appropriate according to need, such as copper, a copper alloy, aluminum, and an aluminum alloy. In the present embodiment, the contact plate 65 is made of aluminum or an aluminum alloy. The contact plate 65 is arranged on the lower surface of the case, and the lower surface 65A thereof serves as a detection surface of the temperature sensor 50.

The temperature detection element 67 is arranged on the upper surface of the contact plate 65. The temperature detection element 67 is constituted by a thermistor, for example. A PTC thermistor or an NTC thermistor can be selected as appropriate as the thermistor.

The case 61 is filled with a filling material 69 in a state in which the temperature detection element 67 is accommodated. Any filling material 69 can be selected as appropriate according to need as the filling material 69, such as thermoplastic resin, thermosetting resin, and silicone resin.

As shown in FIGS. 10 and 11, the above-mentioned temperature detection module 10 is attached to a temperature measurement surface 80A of a measurement target (e.g., a power storage element such as a secondary battery) 80 with the contact plate 65 facing downward and an axis L orienting in the X direction. The two spring portions 70A and 70B bias the temperature sensor 50 in the X direction, that is, in the example shown in FIGS. 10 and 11, downward, and therefore the contact plate 65 comes into surface contact with the temperature measurement surface 80A of the measurement target 80. For this reason, the temperature of the measurement target 80 can be detected by the temperature detection module 10.

It should be noted that the temperature detection module 10 is attached to the measurement target 80 by fixing the sensor holder 20 to the measurement target 80 using an attachment means (not shown). In the example shown in FIG. 11, the temperature detection module 10 is attached by fixing the sensor holder 20 using an engagement means such as a hook to an insulating protector PT attached to a secondary battery 80 included in a battery group.

Next, the procedure for fabricating the temperature detection module 10 will be described with reference to FIGS. 12 to 16.

FIG. 12 is a plan view showing the sensor holder and the temperature sensor, and FIG. 13 is a cross-sectional view showing the sensor holder and the temperature sensor. In order to attach the temperature sensor 50 to the sensor holder 20, the temperature sensor 50 is placed so as to face an opening surface 30A of the accommodating portion 30 of the sensor holder 20 as shown in FIG. 13. At this time, the temperature sensor 50 is placed such that the sensor main body portion 60 faces downward, and the coupling wall 75 coupling the spring portions 70A and 70B faces the locking arm 32 of the sensor holder 20.

Figure 14:
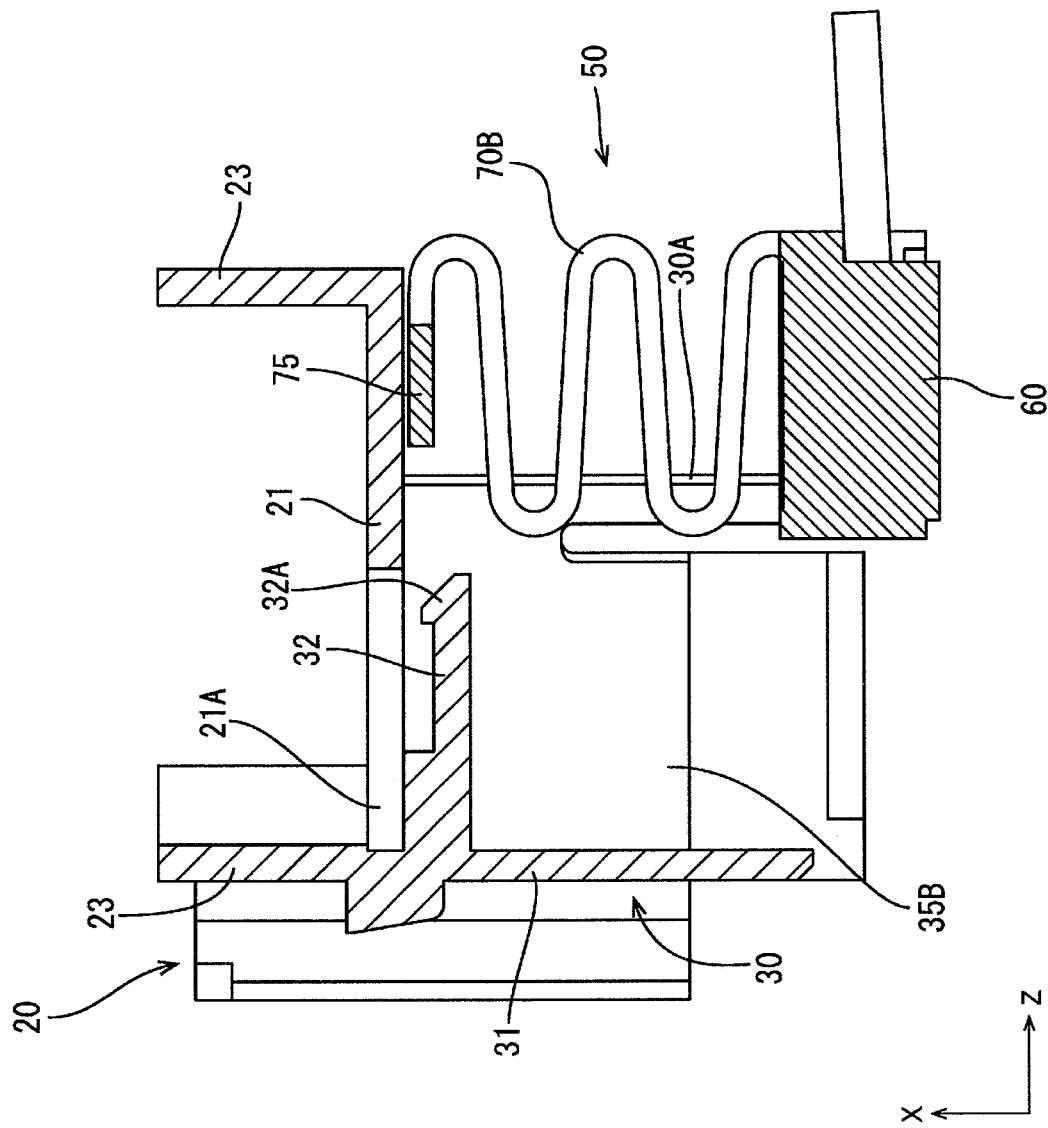
FIG. 14 is a cross-sectional view illustrating the procedure for attaching the temperature sensor to the sensor holder.
Figure 15:
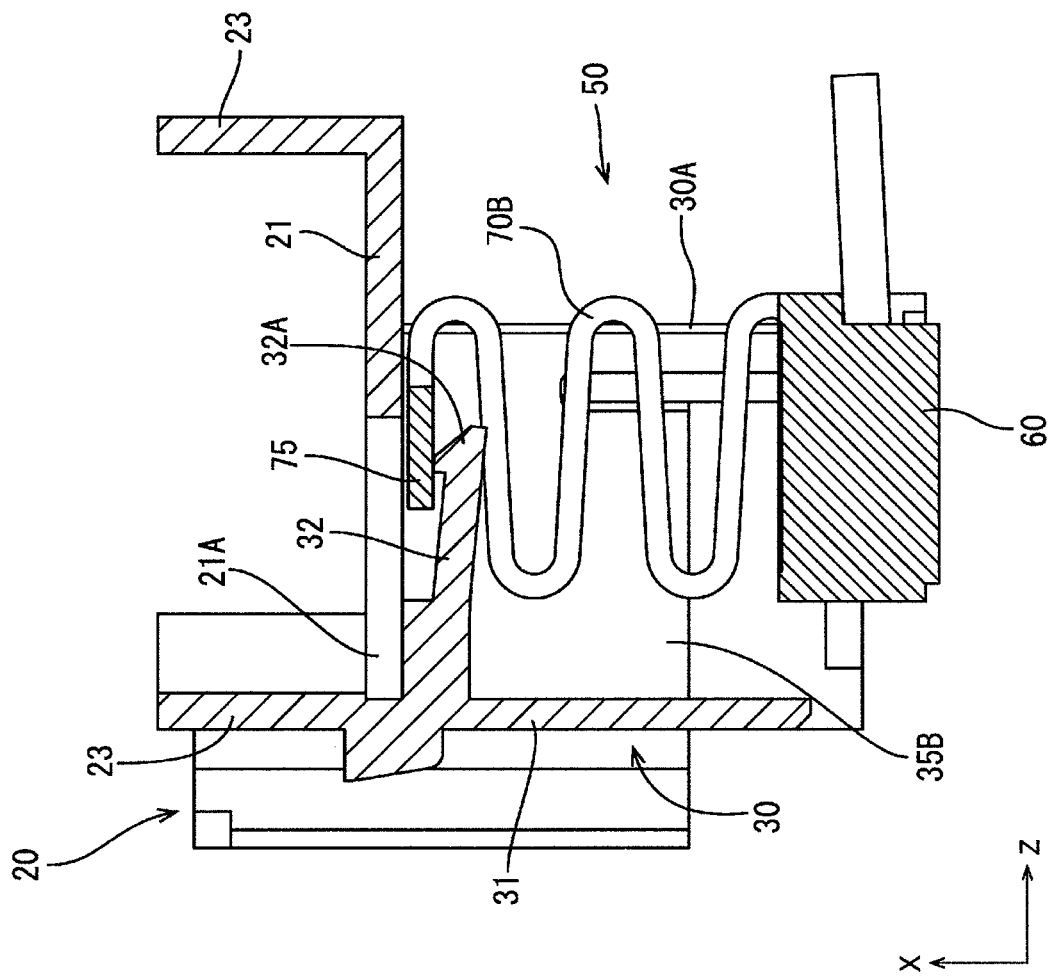
FIG. 15 is a cross-sectional view illustrating the procedure for attaching the temperature sensor to the sensor holder.
Figure 16:
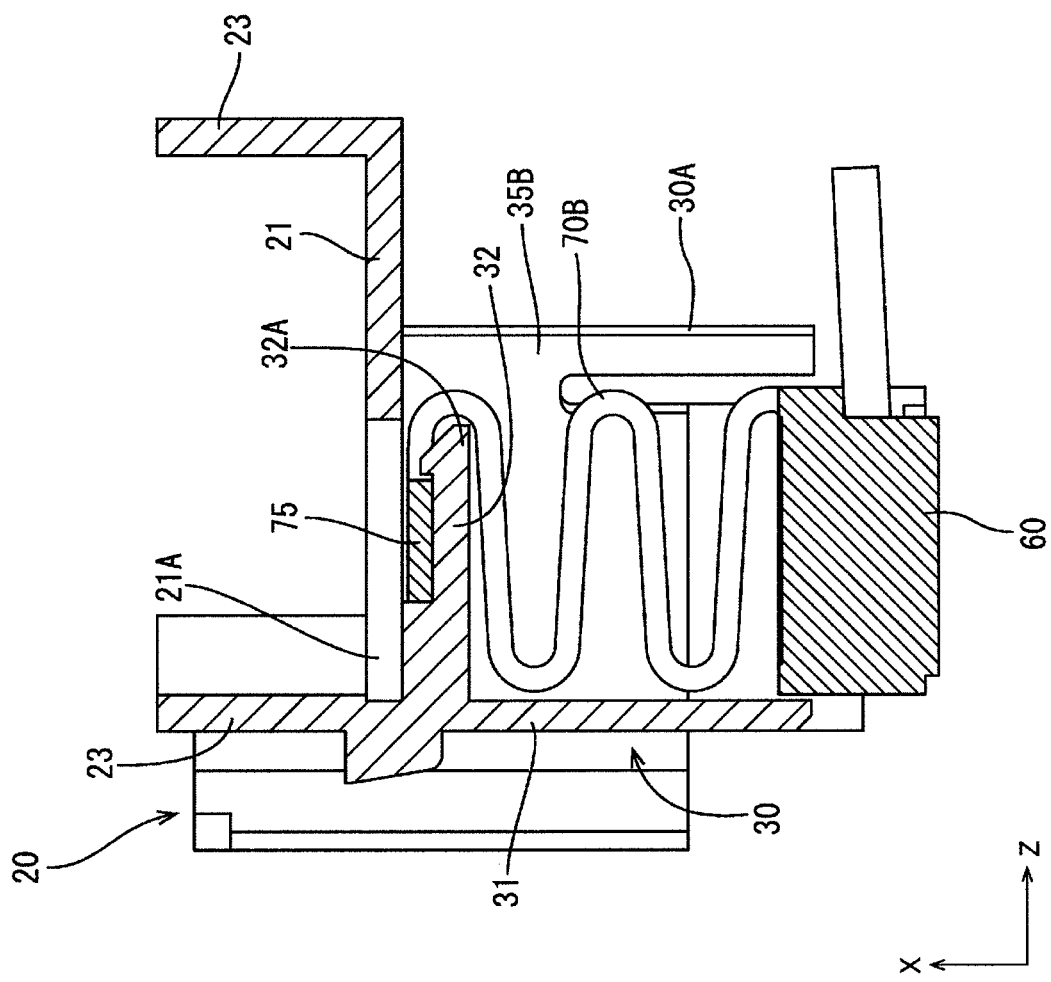
FIG. 16 is a cross-sectional view illustrating the procedure for attaching the temperature sensor to the sensor holder.
Figure 17:
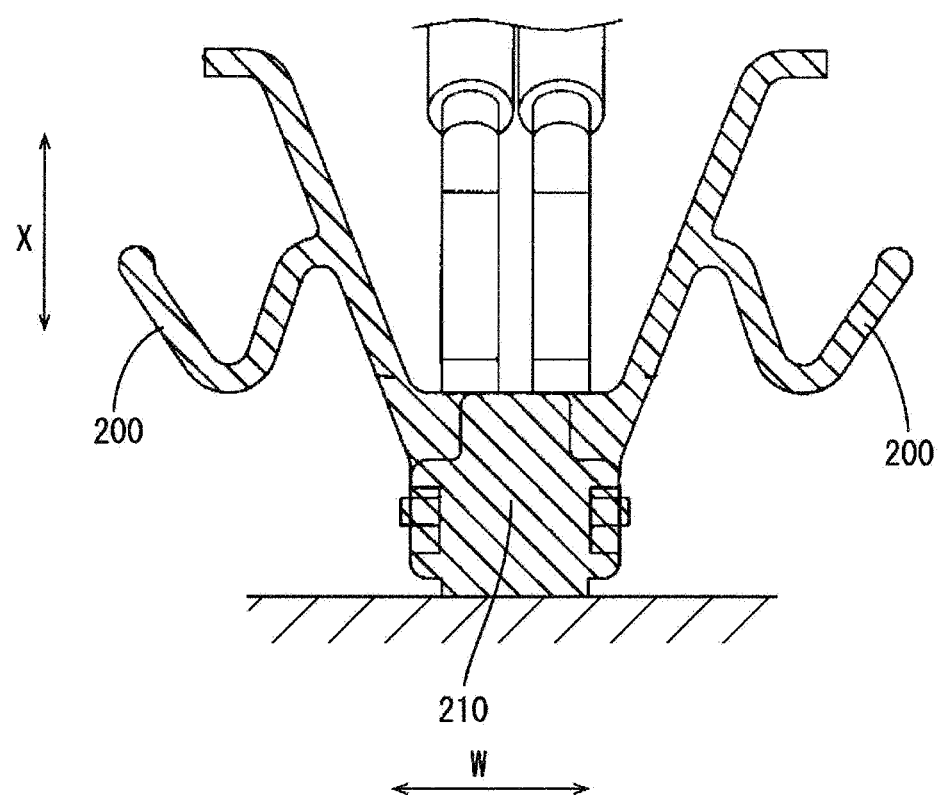
FIG. 17 is a cross-sectional view of a conventional spring.

Then, as indicated by an arrow F in FIG. 13, the temperature sensor 50 is inserted into the accommodating portion 30 of the sensor holder 20 in the Z direction. As shown in FIGS. 14 and 15, while the temperature sensor 50 is being inserted, the coupling wall 75 of the temperature sensor 50 eventually comes into contact with the locking arm 32 of the accommodating portion 30 and presses down the locking arm 32.

As shown in FIG. 15, when the temperature sensor 50 is inserted inside of the accommodating portion 30, the coupling wall 75 passes the hook portion 32A of the locking arm 32. Then, the locking arm 32 elastically returns to the original state from the state in which it warps downward. As a result, the coupling wall 75 is locked to the hook portion 32A of the locking arm 32, and the temperature sensor 50 is thus held by the sensor holder 20. As described above, the temperature sensor 50 is inserted into the accommodating portion 30 in the Z direction and thereby attached thereto.

Here, the locking arm 32 of the sensor holder 20 is configured such that the coupling wall 75 of the temperature sensor 50 is locked thereto in the Z direction. The Z direction is orthogonal to the X direction in which the spring portions 70A and 70B expand and contract, and therefore, the temperature sensor 50 can be attached to the sensor holder 20 without warping of the spring portions 70A and 70B.

Next, the functions and effects of this embodiment will be described.

In the temperature detection module 10 described in Embodiment 1, the spring portions 70A and 70B are used as a biasing member of the temperature sensor 50. The spring portions 70A and 70B expand and contract only in a single direction, and do not expand and contract in the other directions. That is, although the spring portions 70A and 70B are displaced in the X direction, which is an axial direction of the springs, during compression, the spring portions 70A and 70B are not displaced in the W direction and the Z direction, which are not the axial direction, and the dimensions in the W direction and the Z direction do not substantially change from those in the initial state.

Therefore, it is sufficient that a space having dimensions that are equal to those in the initial state in the W direction and the Z direction is ensured in order to attach the springs, and the attachment space can be made narrower compared with a case where a spring that is also displaced in the W direction and the Z direction is used. Therefore, the size of the temperature detection module 10 can be reduced as a whole. Moreover, since the spring portions 70A and 70B are integrated with the sensor main body portion 60, the number of components can be reduced.

The locking arm 32 of the sensor holder 20 is locked to the coupling wall 75 of the temperature sensor 50 in the Z direction. Since the Z direction is orthogonal to the X direction, which is the direction in which the spring portions 70A and 70B expand and contract, the temperature sensor 50 can be attached to the sensor holder 20 without causing the spring portions 70A and 70B to yield.

Moreover, the spring portions 70A and 70B are arranged at positions that are rotationally symmetrical with respect to the center O of the sensor main body portion 60. Therefore, it is possible to suppress inclination of the temperature sensor 50 due to a bias in the spring force.

Furthermore, the stoppers, which are constituted by the fitting portions 36 and the contact portions 62, are provided between the sensor holder 20 and the temperature sensor 50, and restrict the position of the temperature sensor 50 at the restriction position. Therefore, it is possible to suppress excessive warping of the spring portions 70A and 70B of the temperature sensor and deterioration caused thereby.

Other Embodiments

The technique described in this specification is not limited to the embodiment described in the description above and the drawings, and for example, the following embodiments are also included in the technical scope of the technique described in this specification.

(1) In this embodiment, the U-turn folded shape was shown as an example of the shape of the "spring portions". It is sufficient that springs having a shape that expands and contracts only in a single direction (X direction) are used as the "spring portions", and any shape can be selected as appropriate according to need. Moreover, the number of the spring portions is not limited to two.

(2) Furthermore, the temperature detection element 67 is not limited to a thermistor, and any element can by selected as appropriate as long as the temperature can be detected.

LIST OF REFERENCE NUMERALS

10: Temperature detection module
20: Sensor holder
21: Base portion
30: Accommodating portion
32: Locking arm (locking portion)
50: Temperature sensor
60: Sensor main body portion
70A, 70B: Spring portion
80: Measurement target

The invention claimed is:

1. A temperature detection module for detecting a temperature of a measurement target, comprising:
a temperature sensor; and
a holder configured to hold the temperature sensor such that movement is possible in a separation and contact direction in which the temperature sensor is separated from and brought into contact with the measurement target,
wherein the temperature sensor includes:
a sensor main body portion in which a temperature detection element is accommodated; and
at least two spring portions provided integrally on the sensor main body portion and having end portions on a side opposite to the sensor main body portion in the separation and contact direction that are coupled together,
the spring portions expand and contract only in a single direction, and expand and contract only in the separation and contact direction, and
the spring portions are attached to the holder and bias the temperature sensor such that a detection surface comes into contact with the measurement target.

2. The temperature detection module according to claim 1,
wherein stoppers configured to come into contact with each other and thus restrict the position of the temperature sensor relative to the holder when the temperature sensor is displaced to a restriction position are provided between the holder and the temperature sensor.

3. The temperature detection module according to claim 1,
wherein the holder includes a locking portion that is locked to the spring portions in a direction orthogonal to the direction in which the spring portions expand and contract.

4. The temperature detection module according to claim 3, wherein the spring portions are arranged at positions that are rotationally symmetrical with respect to a center of the sensor main body portion.

* * * * *